(12) United States Patent
Kaneda et al.

(10) Patent No.: US 11,699,305 B2
(45) Date of Patent: Jul. 11, 2023

(54) VEHICLE

(71) Applicant: SUBARU CORPORATION, Tokyo (JP)

(72) Inventors: Yukimune Kaneda, Tokyo (JP); Takuya Kishimoto, Tokyo (JP); Konosuke Muramatsu, Tokyo (JP); Yasuhiro Ito, Tokyo (JP); Yuta Suzuki, Tokyo (JP); Ikuo Hirose, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 257 days.

(21) Appl. No.: 16/942,146

(22) Filed: Jul. 29, 2020

(65) Prior Publication Data

US 2021/0097779 A1 Apr. 1, 2021

(30) Foreign Application Priority Data

Sep. 30, 2019 (JP) ................................. 2019-178546

(51) Int. Cl.
G07C 5/00 (2006.01)
B60W 30/18 (2012.01)
G07C 9/00 (2020.01)
G05D 1/02 (2020.01)
G05D 1/00 (2006.01)

(52) U.S. Cl.
CPC ....... *G07C 5/008* (2013.01); *B60W 30/18009* (2013.01); *G05D 1/0022* (2013.01); *G05D 1/0212* (2013.01); *G07C 9/00309* (2013.01)

(58) Field of Classification Search
CPC ............... G07C 5/008; G07C 9/00309; B60W 30/18009; G05D 1/0022; G05D 1/0212
See application file for complete search history.

(56) References Cited

U.S. PATENT DOCUMENTS

| 9,811,086 | B1* | 11/2017 | Poeppel | G06Q 10/0631 |
| 10,049,505 | B1* | 8/2018 | Harvey | G07C 5/0841 |
| 2017/0278312 | A1* | 9/2017 | Minster | G05D 1/0297 |
| 2019/0184946 | A1* | 6/2019 | Friederich | G06Q 10/06311 |
| 2019/0197798 | A1* | 6/2019 | Abari | G06N 5/04 |
| 2019/0204097 | A1* | 7/2019 | Starns | G07C 5/008 |
| 2019/0378350 | A1* | 12/2019 | DeRouen | G07C 5/008 |
| 2020/0364950 | A1* | 11/2020 | Bachant | G06F 16/285 |

FOREIGN PATENT DOCUMENTS

JP 2015-024677 A 2/2015

* cited by examiner

*Primary Examiner* — Peter D Nolan
*Assistant Examiner* — Mikko Okechukwu Obioha
(74) *Attorney, Agent, or Firm* — McGinn I.P. Law Group, PLLC.

(57) ABSTRACT

A vehicle includes a maintenance-necessity detector and an automatic driving controller. The maintenance-necessity detector is configured to determine whether maintenance of the vehicle is necessary. The automatic driving controller is configured to cause the vehicle to move to a maintenance facility at which the maintenance of the vehicle is to be performed, on the basis of automatic driving that is independent of driving to be performed by an occupant of the vehicle, in a case where the maintenance is determined by the maintenance-necessity detector as being necessary.

15 Claims, 4 Drawing Sheets

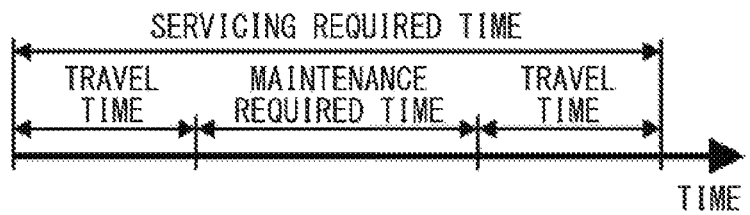
FIG. 2
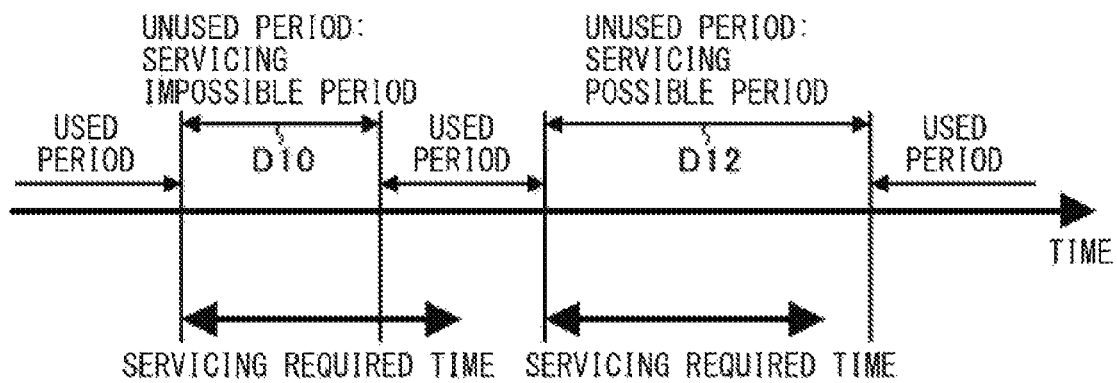
FIG. 3
FIG. 4
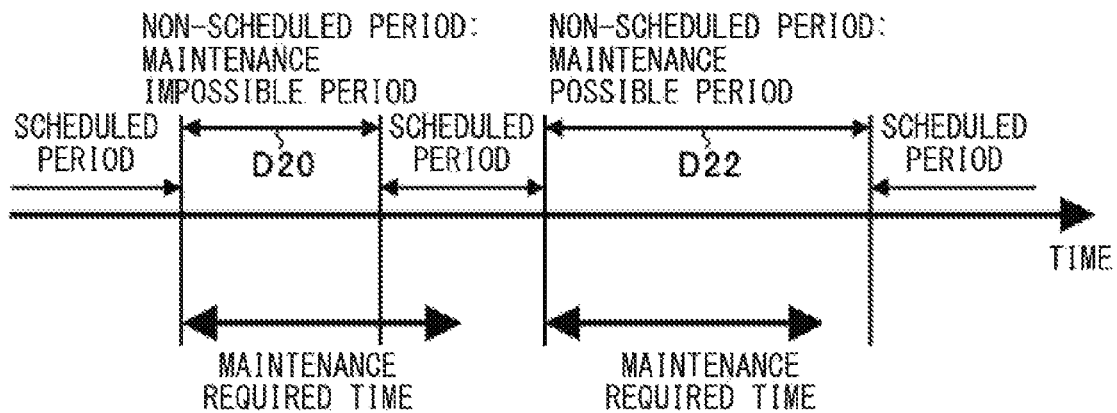
FIG. 5

VEHICLE

CROSS-REFERENCE TO RELATED APPLICATIONS

The present application claims priority from Japanese Patent Application No. 2019-178546 filed on Sep. 30, 2019, the entire contents of which are hereby incorporated by reference.

BACKGROUND

The technology relates to a vehicle capable of performing automatic driving.

In general, a so-called malfunction indication lamp (MIL) lights or blinks upon an occurrence of a malfunction in a vehicle such as an automobile. For example, reference is made to Japanese Unexamined Patent Application Publication No. 2015-24677.

SUMMARY

An aspect of the technology provides a vehicle that includes a maintenance-necessity detector and an automatic driving controller. The maintenance-necessity detector is configured to determine whether maintenance of the vehicle is necessary. The automatic driving controller is configured to cause the vehicle to move to a maintenance facility at which the maintenance of the vehicle is to be performed, on the basis of automatic driving that is independent of driving to be performed by an occupant of the vehicle, in a case where the maintenance is determined by the maintenance-necessity detector as being necessary.

An aspect of the technology provides a vehicle that includes a detector and circuitry. The detector is configured to determine whether maintenance of the vehicle is necessary. The circuitry is configured to cause the vehicle to move to a maintenance facility at which the maintenance of the vehicle is to be performed, on the basis of automatic driving that is independent of driving to be performed by an occupant of the vehicle, in a case where the maintenance is determined by the detector as being necessary.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 2 is a diagram illustrating an example of a maintenance table.

FIG. 3 is a diagram describing a servicing required time.

FIG. 4 is a diagram describing a relationship between the servicing required time and unused periods.

FIG. 5 is a diagram describing a relationship between a maintenance required time and a maintenance possible period.

DETAILED DESCRIPTION

Figure 1:
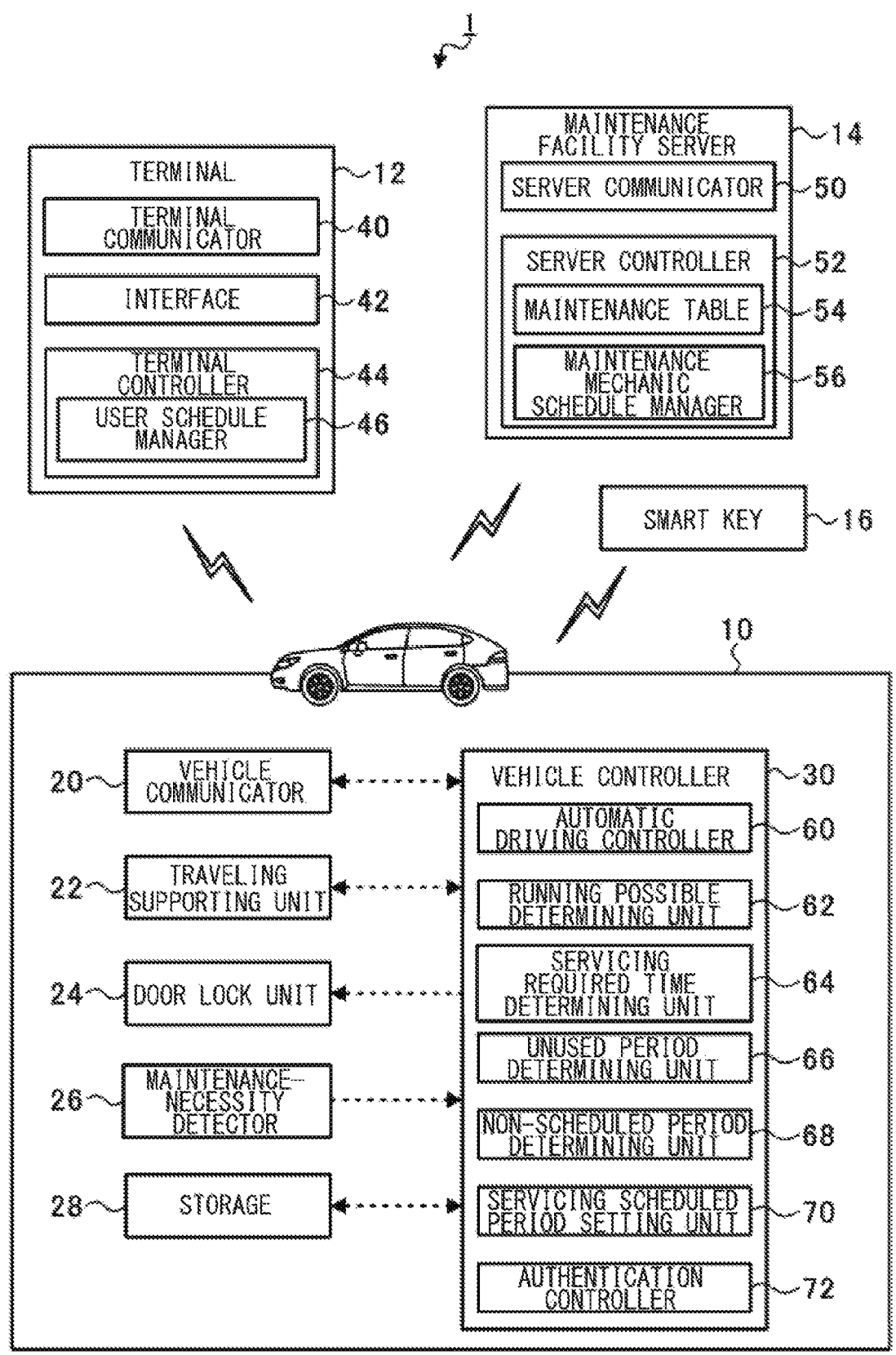
FIG. 1 is a diagram schematically illustrating an example of a configuration of a vehicle maintenance system including a vehicle according to one example embodiment of the technology.

In the event of lighting or blinking of a malfunction indication lamp, a user of a vehicle takes the vehicle to a maintenance facility such as a dealer for maintenance of a malfunctioning part, if the vehicle is still able to run by itself. It is, however, troublesome for the user to take the vehicle to the maintenance facility and to pick up the vehicle following the maintenance.

It is desirable to reduce the user's trouble pertaining to maintenance.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

FIG. 1 schematically illustrates an example of a configuration of a vehicle maintenance system 1 including a vehicle 10 according to an example embodiment of the technology. The vehicle maintenance system 1 may include: the vehicle 10 to be subjected to maintenance; a terminal 12 belonging to an administrator (or a user) of the vehicle 10; a maintenance facility server 14 provided at a maintenance facility; and a smart key 16. Hereinafter, a detailed description is given of configurations and processes related to an example embodiment, and any configuration and process less related to an example embodiment will not be described in detail.

The vehicle 10 may be configured to move to a destination on the basis of automatic driving without relying on driving to be performed by an occupant. The vehicle 10 may be an automobile. The vehicle 10 includes a maintenance-necessity detector 26 and a vehicle controller 30. The vehicle 10 may also include a vehicle communicator 20, a traveling supporting unit 22, a door lock unit 24, and a storage 28.

The vehicle communicator 20 may be configured to communicate wirelessly with the terminal 12, the maintenance facility server 14, and the smart key 16.

The terminal 12 may be any device such as a smartphone, a tablet, or a personal computer. The terminal 12 may be intended to be used by or belong to the user of the vehicle 10. The terminal 12 may include a terminal communicator 40, an interface 42, and a terminal controller 44.

The terminal communicator 40 may be configured to communicate wirelessly with the vehicle communicator 20 of the vehicle 10. The interface 42 may have an input function of receiving an input operation performed by a user and an output function of displaying various pieces of information. For example, the interface 42 may be a touch panel. The user of the terminal 12 may be the user of the vehicle 10.

The terminal controller 44 may include a semiconductor integrated circuit including, without limitation, a central processing unit (CPU), a read-only memory (ROM), and a random-access memory (RAM). The ROM may contain a program, for example. The RAM may serve as a work area.

The terminal controller 44 may execute a schedule management application program to serve as a user schedule manager 46.

The user schedule manager 46 may manage a schedule inputted by the user through the interface 42. For example, a storage area, such as the RAM, that serves as the user schedule manager 46 may contain schedule data related to a user's schedule inputted by the user. Such a user schedule data may include a schedule on a future activity of the user and a time that are associated with each other.

The user schedule data may also include a schedule on use of the vehicle 10. Such a use schedule may be associated with a time. For example, the use schedule may be a schedule to use the vehicle 10 for commuting. The user schedule data may further include a period during which the user is scheduled not to use the vehicle 10. Hereinafter, such a period is sometimes referred to as an "unused period".

The maintenance facility server 14 may include a server communicator 50 and a server controller 52. The server communicator 50 may be configured to communicate wirelessly with the vehicle communicator 20 of the vehicle 10.

The server controller 52 may include a semiconductor integrated circuit including, without limitation, a central processing unit (CPU), a read-only memory (ROM), and a random-access memory (RAM). The ROM may contain a program, for example. The RAM may serve as a work area. The server controller 52 may include a storage area, such as the RAM, that contains a maintenance table 54.

FIG. 2 illustrates an example of the maintenance table 54. The maintenance table 54 may include a maintenance content, a maintenance required time, a maintenance mechanic (or a maintenance mechanic in charge), and a maintenance mechanic identifier. The maintenance content may be a content of maintenance of the vehicle 10 to be performed at the maintenance facility. The maintenance content may relate to a location and/or details of a part with malfunction or a part to be subjected to maintenance in the vehicle 10. The maintenance required time may be a time required to perform the maintenance. The maintenance mechanic may be a person having an ability to do work related to the maintenance content. The maintenance mechanic identifier may identify the maintenance mechanic. The maintenance mechanic identifier may correspond to an identifier set to the smart key 16 used by or belonging to the maintenance mechanic. The maintenance content, the maintenance required time, the maintenance mechanic, and the maintenance mechanic identifier may be associated with each other.

Using the maintenance table 54 helps to derive, from the maintenance content included in the maintenance table 54, the maintenance required time required for the maintenance, the maintenance mechanic, and the maintenance mechanic identifier. Note that the maintenance content, the maintenance required time, the maintenance mechanic, and the maintenance mechanic identifier specifically illustrated in FIG. 2 are merely illustrative and non-limiting.

Returning to FIG. 1, the server controller 52 may execute the schedule management application program to serve as a maintenance mechanic schedule manager 56. The maintenance mechanic schedule manager 56 may manage a schedule of one or a plurality of maintenance mechanics working at the maintenance facility. For example, a storage area, such as the RAM, that serves as the maintenance mechanic schedule manager 56 may contain, for each of the maintenance mechanics, schedule data related to the schedule of the maintenance mechanic. Such a maintenance mechanic schedule data may be directly inputted into the maintenance facility server 14 through an unillustrated interface of the maintenance facility server 14, or may be indirectly inputted into the maintenance facility server 14 through an interface of an unillustrated terminal belonging to the maintenance mechanic.

The maintenance mechanic schedule data may include a schedule on a future activity of the maintenance mechanic (such as a maintenance schedule) and a time that are associated with each other. Using the maintenance mechanic schedule data helps to know a period during which the maintenance is possible by the maintenance mechanic and to make a new reservation of the maintenance for the maintenance mechanic.

The traveling supporting unit 22 of the vehicle 10 may include unillustrated mechanisms and devices including, without limitation: a drive mechanism such as an engine; a braking mechanism such as brakes; a steering mechanism such as a steering gear; and various sensors including an acceleration sensor and a speed sensor. The traveling supporting unit 22 may also include unillustrated devices including, without limitation: an imaging device that performs imaging of an environment that is present outside the vehicle 10 in a direction such as a traveling direction of the vehicle 10; and a vehicle external environment recognition device that recognizes the environment outside the vehicle 10 on the basis of images captured by the imaging device. The traveling supporting unit 22 may drive the vehicle 10 under control of the vehicle controller 30, in a case where instructions to start automatic driving is given to the traveling supporting unit 22. For example, the traveling supporting unit 22 may perform acceleration, deceleration, and steering of the vehicle 10 upon the automatic driving.

The storage 28 may be a non-volatile storage device such as a hard disk drive or a flash memory. The storage 28 may contain in advance an identifier that identifies the vehicle 10. Hereinafter, the identifier stored in the storage 28 is sometimes referred to as a "first identifier". In one embodiment, the storage 28 may serve as a "storage".

The smart key 16, or also called an access key, may be configured to communicate wirelessly with the vehicle 10. The smart key 16 may be configured to give instructions to lock and unlock doors of the vehicle 10. The smart key 16 may contain in advance an identifier that identifies the smart key 16. Hereinafter, the identifier stored in the smart key 16 is sometimes referred to as a "second identifier". The second identifier of the smart key 16 corresponding in a qualified fashion to the vehicle 10 may coincide with the first identifier stored in the storage 28 of the vehicle 10. As described later in greater detail, the first identifier and the second identifier may be used to perform authentication as to whether the smart key 16 corresponds to the vehicle 10 in a qualified fashion.

The door lock unit 24 may lock the doors of the vehicle 10 in a case where the door lock unit 24 has received, from the vehicle controller 30, a predetermined lock signal that is based on the instructions of the smart key 16. The door lock unit 24 may unlock the doors of the vehicle 10 in a case where the door lock unit 24 has received, from the vehicle controller 30, a predetermined unlock signal that is based on the instructions of the smart key 16.

The maintenance-necessity detector 26 determines whether the maintenance of the vehicle 10 is necessary. The maintenance-necessity detector 26 may determine whether the maintenance of the vehicle 10 is necessary on the basis of unillustrated various sensors of the vehicle 10. For example, the maintenance-necessity detector 26 may operate in conjunction with a malfunction indication lamp, or a so-called MIL. In some embodiments, the maintenance-necessity detector 26 may determine that the maintenance of the vehicle 10 is necessary in a case where one or more of various warning lights light or blink. In some embodiments, the maintenance-necessity detector 26 may determine that the maintenance of the vehicle 10 is necessary regardless of the lighting or the blinking of the malfunction indication lamp if the maintenance of the vehicle 10 is necessary. The maintenance-necessity detector 26 may transmit maintenance-necessary data to the vehicle controller 30 in a case where the maintenance-necessity detector 26 has determined that the maintenance of the vehicle 10 is necessary. The maintenance-necessary data may indicate that the maintenance of the vehicle 10 is necessary. In one embodiment, the maintenance-necessity detector 26 may serve as a "detector".

For example, the maintenance-necessary data may include: a malfunction of a vehicle air conditioner; a replacement of engine oil; a shortage of washer fluid; a malfunction of any of lights such as a blinker light; a flat tire; and an engine trouble, although the contents of the maintenance-necessary data are not limited thereto. It is to be also noted that the maintenance-necessary data is not limited to data related to a malfunction or a failure. For example, the maintenance-necessary data may include a timing and/or a content of any maintenance including a regular safety inspection of the vehicle 10 i.e., a vehicle inspection.

The vehicle controller 30 may include a semiconductor integrated circuit including, without limitation, a central processing unit (CPU), a read-only memory (ROM), and a random-access memory (RAM). The ROM may contain a program, for example. The RAM may serve as a work area. The vehicle controller 30 may execute a program to serve as an automatic driving controller 60, a running possible determining unit 62, a servicing required time determining unit 64, an unused period determining unit 66, a non-scheduled period determining unit 68, a servicing scheduled period setting unit 70, and an authentication controller 72.

The automatic driving controller 60 may acquire various pieces of data related to driving. Non-limiting examples of the driving data may include: an environment outside the vehicle 10; an acceleration of the vehicle 10; a speed of the vehicle 10; an engine speed; a lane on which the vehicle 10 travels; and map data, traffic data, and a traveling course that are based on an unillustrated navigation device. The automatic driving controller 60 may also acquire, from another vehicle, various pieces of data belonging to the other vehicle. Non-limiting examples of the data of the other vehicle may include: a position of the other vehicle; an acceleration of the other vehicle; and a torque of the other vehicle. The automatic driving controller 60 may comprehensively determine the acquired various pieces of data, thereby controlling the traveling supporting unit 22 and performing the automatic driving of the vehicle 10 accordingly. In one embodiment, the automatic driving controller 60 may serve as an "automatic driving controller".

The running possible determining unit 62 may determine, on the basis of the maintenance content represented by the maintenance-necessary data, whether the vehicle 10 is able to run by itself to move to the maintenance facility, in a case where the maintenance is determined as being necessary. For example, the running possible determining unit 62 may contain in advance a running possible table in which contents of the maintenance-necessary data and whether or not the vehicle 10 is able to run by itself are associated with each other. The running possible determining unit 62 may apply the maintenance-necessary data to the running possible table to determine whether the vehicle 10 is able to run by itself.

For example, the running possible determining unit 62 may determine that the vehicle 10 is able to run by itself to move to the maintenance facility in a case where the maintenance-necessary data indicates the malfunction of the vehicle air conditioner, the replacement of engine oil, or any factor that allows the vehicle 10 to still run by itself. In contrast, the running possible determining unit 62 may determine that the vehicle 10 is unable to run by itself to move to the maintenance facility in a case where the maintenance-necessary data indicates the flat tire, the engine trouble, or any other factor that makes the vehicle 10 difficult or unable to run by itself. In one embodiment, the running possible determining unit 62 may serve as a "running possible determining unit".

The vehicle controller 30 may request a component, such as the maintenance facility server 14, to dispatch the maintenance mechanic to the vehicle 10 in a case where: the maintenance is determined as being necessary; and the vehicle 10 is determined as being unable to run by itself.

The automatic driving controller 60 causes the vehicle 10 to move to the maintenance facility at which the maintenance of the vehicle 10 is to be performed, on the basis of the automatic driving that is independent of the driving to be performed by the occupant. The automatic driving controller 60 may cause the vehicle 10 to move to the maintenance facility on the basis of the automatic driving in a case where: the maintenance is determined as being necessary; and the vehicle 10 is determined as being able to run by itself.

In some embodiments, in a case where: the maintenance is determined as being necessary; and the vehicle 10 is determined as being able to run by itself, the automatic driving controller 60 may cause the vehicle 10 to move to the maintenance facility upon non-use of the vehicle 10 by the user. In the following, a description is given of an example embodiment in which the vehicle 10 is moved on the basis of the automatic driving when the user does not use the vehicle 10.

The servicing required time determining unit 64 may determine a servicing required time. The serving required time may be a time required for the vehicle 10 to be serviced at the maintenance facility for the maintenance of the vehicle 10. The servicing required time determining unit 64 may determine the servicing required time on the basis of a travel time and the maintenance required time. The travel time may be a time required for the vehicle 10 to move to the maintenance facility. The maintenance required time may be the time required to perform the maintenance and represented by the maintenance-necessary data. In one embodiment, the servicing required time determining unit 64 may serve as a "servicing required time determining unit".

FIG. 3 describes the servicing required time. Referring to FIG. 3, the servicing required time may be a time in which the maintenance required time and a round-trip travel time are added. The round-trip travel time may include the travel time to the maintenance facility and the travel time from the maintenance facility. For example, it takes 5 hours for the vehicle 10 to be serviced at the maintenance facility, if 3 hours are required for the maintenance and 2 hours are required for the round-trip travel to and from the maintenance facility.

In one example, the servicing required time determining unit 64 may determine a traveling course from home of the user to the maintenance facility and vice versa. The servicing required time determining unit 64 may determine the travel time corresponding to the round-trip travel on the basis of the determined traveling course. The maintenance facility may be the user's regular maintenance facility such as a dealer, although the maintenance facility is not limited thereto. Further, the travel time may be determined on the basis of the traveling course from the home of the user to the maintenance facility and vice versa in one example, in view of the vehicle 10 which is often parked at the home of the user when the vehicle 10 is not in use for a long time, although the calculation of the travel time is not limited to the traveling course based on the home of the user.

The servicing required time determining unit 64 may further transmit the maintenance-necessary data to the maintenance facility server 14 through the vehicle communicator 20. The server controller 52 may apply the maintenance content represented by the maintenance-necessary data to the maintenance table 54, and may transmit, to the vehicle 10, the maintenance required time corresponding to the maintenance content represented by the maintenance-necessary data. The servicing required time determining unit 64 may be thus able to acquire the maintenance required time corresponding to the maintenance content represented by the maintenance-necessary data. The servicing required time determining unit 64 may determine the servicing required time on the basis of the thus-acquired maintenance required time and the round-trip travel time.

Returning to FIG. 1, the unused period determining unit 66 may determine the unused period. The unused period may be the period during which the user is scheduled not to use the vehicle 10. For example, the unused period determining unit 66 may acquire the user schedule data from the user schedule manager 46 of the terminal 12 through the vehicle communicator 20. Further, the unused period determining unit 66 may determine the unused period on the basis of the thus-acquired user schedule data. In some embodiments, the terminal controller 44 may determine the unused period, and the unused period determining unit 66 may acquire the unused period determined by the terminal controller 44. In one embodiment, the unused period determining unit 66 may serve as an "unused period determining unit".

The non-scheduled period determining unit 68 may determine a non-scheduled period. The non-scheduled period may be a period during which the maintenance mechanic (or the maintenance mechanic in charge) who performs the maintenance of the vehicle 10 has no schedule. For example, the non-scheduled period may be a period in which a maintenance schedule for another vehicle has not yet been set in the future schedule of the maintenance mechanic in charge. In one embodiment, the non-scheduled period determining unit 68 may serve as a "non-scheduled period determining unit".

The non-scheduled period determining unit 68 may acquire the maintenance mechanic schedule data related to the schedule of the maintenance mechanic (or the maintenance mechanic in charge) who performs the maintenance of the vehicle 10. The non-scheduled period determining unit 68 may acquire the maintenance mechanic schedule data from the maintenance mechanic schedule manager 56 of the maintenance facility server 14 through the vehicle communicator 20. The non-scheduled period determining unit 68 may determine the non-scheduled period of the maintenance mechanic in charge on the basis of the thus-acquired maintenance mechanic schedule data of the maintenance mechanic in charge. In some embodiments, the server controller 52 may determine the non-scheduled period of the maintenance mechanic in charge, and the non-scheduled period determining unit 68 may acquire the non-scheduled period of the maintenance mechanic in charge determined by the server controller 52.

The servicing scheduled period setting unit 70 may set a servicing scheduled period. The servicing scheduled period may be a period during which the vehicle 10 is scheduled to be serviced at the maintenance facility for the maintenance of the vehicle 10. In some embodiments, the servicing scheduled period setting unit 70 may set the servicing scheduled period on the basis of the unused period that is equal to or longer than the servicing required time, out of one or more unused periods. In one embodiment, the servicing scheduled period setting unit 70 may serve as a "servicing scheduled period setting unit".

FIG. 4 describes a relationship between the servicing required time and the unused periods. FIG. 4 illustrates an example of user's future schedules in which the user uses the vehicle 10 and user's future schedules in which the user does not use the vehicle 10. Referring to FIG. 4, if the unused period is shorter than the servicing required time as indicated by arrows D10, it is highly likely that the vehicle 10 does not come back within the unused period in a case where the vehicle 10 is moved to the maintenance facility in the unused period. Accordingly, the unused period that is shorter than the servicing required time may be set as a servicing impossible period during which the servicing of the vehicle 10 at the maintenance facility is not possible.

In contrast, if the unused period is equal to or longer than the servicing required time as indicated by arrows D12, it is possible for the vehicle 10 following the maintenance to come back within the unused period in a case where the vehicle 10 is moved to the maintenance facility in the unused period. Accordingly, the unused period that is equal to or longer than the servicing required time may be set as a servicing possible period during which the servicing of the vehicle 10 at the maintenance facility is possible. The servicing scheduled period setting unit 70 may set the servicing scheduled period on the basis of the servicing possible period, i.e., on the basis of the unused period that is equal to or longer than the servicing required time.

The servicing scheduled period setting unit 70 may also set a maintenance performing period. The maintenance performing period may be a period during which the maintenance is scheduled to be performed. In some embodiments, the servicing scheduled period setting unit 70 may set the maintenance performing period on the basis of the non-scheduled period that is equal to or longer than the maintenance required time, out of one or more non-scheduled periods. Accordingly, the servicing scheduled period may be set that includes the maintenance performing period.

FIG. 5 describes a relationship between the maintenance required time and the maintenance possible period. FIG. 5 illustrates an example of presence and absence of a future maintenance schedule of the maintenance mechanic (or the maintenance mechanic in charge). In FIG. 5, a scheduled period may be a period in which a schedule has been already set. For example, the scheduled period may be a period during which a schedule to perform maintenance of another vehicle has been set.

Referring to FIG. 5, if the non-scheduled period is shorter than the maintenance required time as indicated by arrows D20, it is highly likely that the maintenance of the vehicle 10 is not completed within the non-scheduled period in a case where the maintenance based on the maintenance content (i.e., the maintenance content to be carried out) represented by the maintenance-necessary data is performed in the non-scheduled period. Accordingly, the non-scheduled period that is shorter than the maintenance required time may be set as a maintenance impossible period during which the maintenance of the vehicle 10 is not possible.

In contrast, if the non-scheduled period is equal to or longer than the maintenance required time as indicated by arrows D22, it is possible to complete the maintenance of the vehicle 10 within the non-scheduled period in a case where the maintenance content to be carried out is performed in the non-scheduled period. Accordingly, the non-scheduled period that is equal to or longer than the maintenance required time may be set as a maintenance possible period during which the maintenance of the vehicle 10 is possible. The servicing scheduled period setting unit 70 may set the maintenance performing period on the basis of the maintenance possible period, i.e., on the basis of the non-scheduled period that is equal to or longer than the maintenance required time.

Hence, the servicing scheduled period setting unit 70 may so set the servicing scheduled period that the servicing scheduled period falls within the servicing possible period and that the maintenance performing period within the servicing scheduled period falls within the maintenance possible period.

Figure 6:
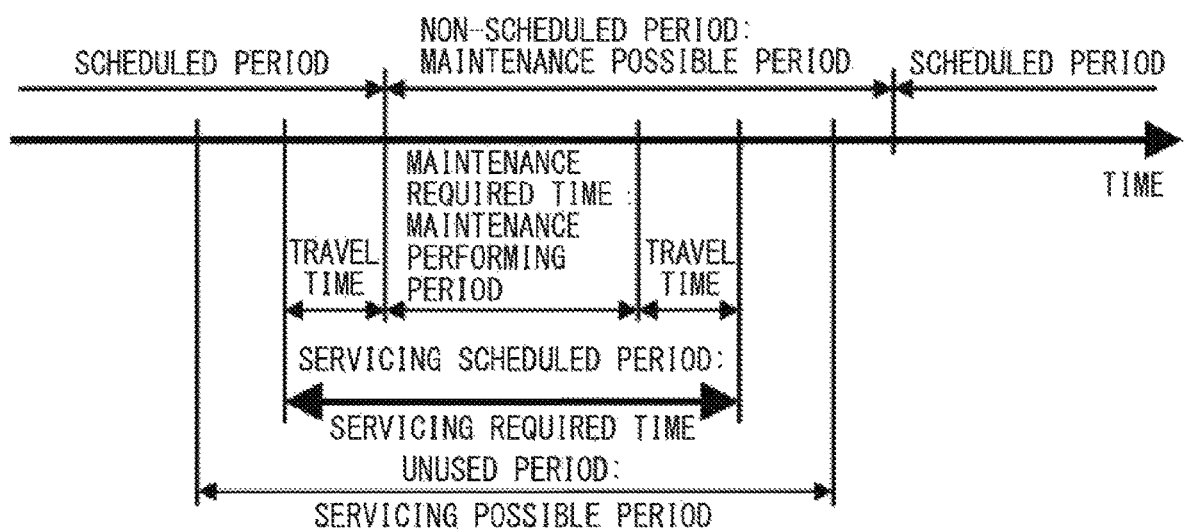
FIG. 6 is a diagram illustrating an example of a servicing scheduled period.

FIG. 6 illustrates an example of the servicing scheduled period. Referring to FIG. 6, the maintenance performing period may be set to fall within the non-scheduled period that is equal to or longer than the maintenance required time (i.e., the maintenance possible period), and the servicing scheduled period may be set to fall within the unused period that is equal to or longer than the servicing required time (i.e., the servicing possible period). FIG. 6 illustrates an example of setting the servicing scheduled period in which a time of the start of the travel time that is before the maintenance performing period (i.e., a servicing start time) is after a scheduled start time of the unused period, and in which a time of the end of the travel time that is after the maintenance performing period (i.e., a servicing end time) is before a scheduled end time of the unused period.

Returning to FIG. 1, the storage 28 may contain in advance the first identifier that identifies the administrator (or the user) who takes control of the vehicle 10. The smart key 16 may transmit, to the vehicle 10, the second identifier that identifies the administrator of the smart key 16. The smart key 16 may transmit the second identifier to the vehicle 10 in addition to the instructions to lock the doors and the instructions to unlock the doors. The second identifier of the smart key 16 that corresponds in a qualified fashion to the vehicle 10 may coincide with the first identifier.

The authentication controller 72 may permit locking and unlocking of the doors in a case where the first identifier stored in advance in the storage 28 and the second identifier transmitted from the smart key 16 have a predetermined relationship. Non-limiting examples of the case where the first identifier and the second identifier have the predetermined relationship may include: a case where the first identifier and the second identifier coincide with each other; and a case where the first identifier and the second identifier are approximate to each other within a margin of error. The authentication controller 72 may transmit, to the door lock unit 24, the lock signal to lock the doors in a case where the authentication controller 72 has permitted the locking of the doors. The authentication controller 72 may transmit, to the door lock unit 24, the unlock signal to unlock the doors in a case where the authentication controller 72 has permitted the unlocking of the doors. In other words, the smart key 16 used by or belonging to the administrator (or the user) of the vehicle 10 may allow for the locking and the unlocking of the doors of the vehicle 10. In one embodiment, the authentication controller 72 may serve as an "authentication controller".

In one example, the smart key 16 may instruct starting of a power unit (or an engine) of the vehicle 10, or may instruct initiation of the automatic driving. In such an example, the authentication controller 72 may permit the starting of the power unit (or the engine) or may permit the initiation of the automatic driving, in a case where the second identifier transmitted from the smart key 16 has a predetermined relationship with the first identifier.

It is to be noted that the doors of the vehicle 10 are locked to protect against theft in a case where the user does not use the vehicle 10, meaning that the doors of the vehicle 10 are locked when the vehicle 10 is brought to the maintenance facility by automatic traveling. Further, the maintenance mechanic of the maintenance facility does not have the smart key 16 that corresponds in a qualified fashion to the thus-arrived vehicle 10. If the maintenance mechanic is unable to unlock the doors of the vehicle 10, it can affect the maintenance work to be performed by the maintenance mechanic.

To address such a concern, in a case where the maintenance is determined as being necessary, the authentication controller 72 may cause the second identifier (e.g., the maintenance mechanic identifier) of the smart key 16, used by the maintenance mechanic who performs the maintenance of the vehicle 10, to be stored in the storage 28 as the first identifier, during a period in which the maintenance of the vehicle 10 is to be performed.

For example, in a case where a time of the start of the servicing scheduled period (i.e., a start time to move the vehicle 10 to the maintenance facility) has come, the authentication controller 72 may make an inquiry at the maintenance facility server 14 through the vehicle communicator 20 about the maintenance mechanic identifier that corresponds to the maintenance mechanic in charge. The server controller 52 may apply the maintenance mechanic in charge or the maintenance content to be carried out to the maintenance table 54 to derive the maintenance mechanic identifier of the maintenance mechanic in charge, and may transmit the thus-derived maintenance mechanic identifier to the vehicle 10 through the server communicator 50. This allows the authentication controller 72 to acquire the maintenance mechanic identifier of the maintenance mechanic in charge, i.e., the second identifier of the smart key 16 used by or belonging to the maintenance mechanic in charge. Thereafter, the authentication controller 72 may cause the storage 28 to store, additionally as the first identifier, the thus-acquired maintenance mechanic identifier, i.e., the second identifier of the smart key 16 used by the maintenance mechanic in charge.

The maintenance mechanic in charge may unlock the doors of the vehicle 10 with his/her own smart key 16 for the maintenance in a case where the vehicle 10 is brought to the maintenance facility. In other words, the authentication controller 72 may receive the second identifier, i.e., the maintenance mechanic identifier, transmitted from the smart key 16 of the maintenance mechanic in charge. The authentication controller 72 may permit the unlocking of the doors and may cause the door lock unit 24 to unlock the doors, in view of the coincidence between the maintenance mechanic identifier (i.e., the first identifier) of the maintenance mechanic in charge additionally stored in the storage 28 and the maintenance mechanic identifier (i.e., the second identifier) received from the smart key 16 of the maintenance mechanic in charge.

The authentication controller 72 may cause the storage 28 to delete the maintenance mechanic identifier that has been additionally stored as the first identifier, in a case where a time of the end of the servicing scheduled period has come. In some embodiments, the authentication controller 72 may cause the storage 28 to delete the maintenance mechanic identifier in response to moving of a current location of the vehicle 10 to the home or any other designated location, on the basis of a satellite navigation system such as a global positioning system (GPS).

In an example embodiment described above, the maintenance mechanic identifier may be temporarily held from the start of the servicing of the vehicle 10 to the maintenance facility to the end of the servicing of the vehicle 10 to the maintenance facility. In some embodiments, a period in which the maintenance mechanic identifier is stored in the storage 28 may be from the arrival of the vehicle 10 to the maintenance facility to the departure of the vehicle 10 from the maintenance facility.

In an example embodiment described above, the second identifier, i.e., the maintenance mechanic identifier, of the smart key 16 of the maintenance mechanic in charge may be temporarily held in the storage 28 of the vehicle 10. In some embodiments, in a case where the maintenance is determined as being necessary, the authentication controller 72 may cause the smart key 16 used by the maintenance mechanic who performs the maintenance of the vehicle 10 to store, as the second identifier, an identifier that is common to the first identifier stored in the storage 28 of the vehicle 10, during the period in which the maintenance of the vehicle 10 is to be performed. Such embodiments also allow the maintenance mechanic to, for example, unlock the doors of the vehicle 10 to perform the maintenance.

In one example, the authentication controller 72 may create a new identifier. The authentication controller 72 may cause the storage 28 of the vehicle 10 to additionally store the new identifier as the first identifier, and may cause the smart key 16 of the maintenance mechanic in charge to additionally store the new identifier as well. In such an example, the authentication controller 72 may transmit the new identifier to the maintenance facility server 14, and may transmit the new identifier to the smart key 16 of the maintenance mechanic in charge through the maintenance facility server 14 via a wireless communication.

In an alternative example, the authentication controller 72 may cause the smart key 16 of the maintenance mechanic in charge to additionally store the first identifier stored in advance in the storage 28 of the vehicle 10. In other words, the authentication controller 72 may cause the smart key 16 of the maintenance mechanic in charge to additionally store the first identifier that coincides with the second identifier of the smart key 16 of the user. In such an alternative example, the authentication controller 72 may update the second identifier of the smart key 16 of the user and the first identifier that is stored in the storage 28 and coincides with the second identifier of the smart key 16 of the user.

Figure 7:
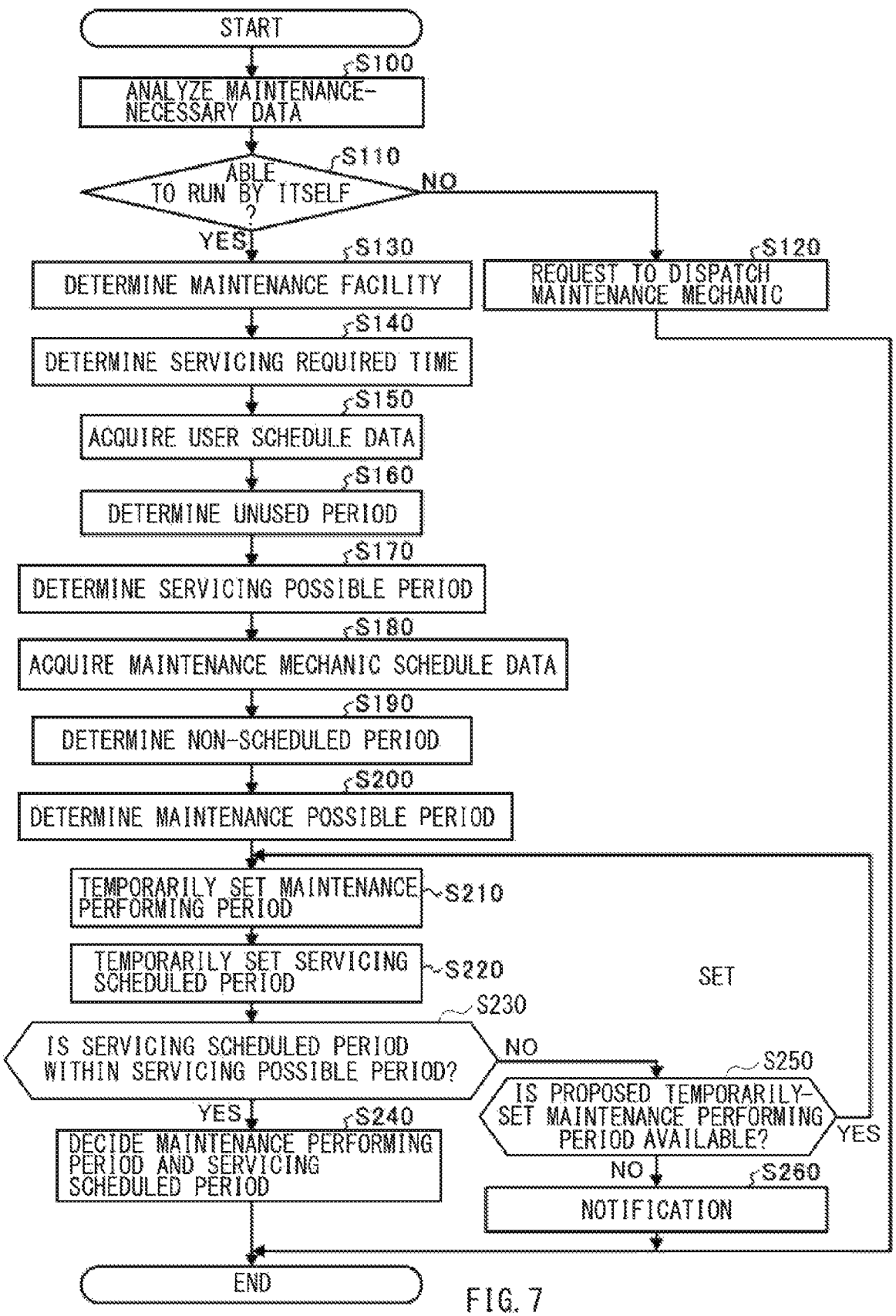
FIG. 7 is a flowchart illustrating an example of a flow of an operation to be performed by a vehicle controller in a case where maintenance is determined as being necessary.

FIG. 7 is a flowchart illustrating an example of a flow of an operation to be performed by the vehicle controller 30 in a case where the maintenance is determined as being necessary. The maintenance-necessity detector 26 may transmit the maintenance-necessary data to the vehicle controller 30 in a case where the maintenance-necessity detector 26 has determined that the maintenance is necessary. The vehicle controller 30 may perform a series of processes illustrated by way of example in FIG. 7 in a case where the vehicle controller 30 has received the maintenance-necessary data from the maintenance-necessity detector 26.

First, the running possible determining unit 62 may analyze the maintenance-necessary data (step S100). Thereafter, the running possible determining unit 62 may determine, on the basis of the maintenance content represented by the maintenance-necessary data, whether the vehicle 10 is able to run by itself (step S110). If the running possible determining unit 62 has determined that the vehicle 10 is difficult or not able to run by itself (step S110: NO), the running possible determining unit 62 may request a component, such as the maintenance facility server 14 at the user's regular maintenance facility, to dispatch the maintenance mechanic to the vehicle 10 (step S120). The series of processes may end thereafter.

If the running possible determining unit 62 has determined that the vehicle 10 is able to run by itself (step S110: YES), the servicing required time determining unit 64 may determine the maintenance facility at which the maintenance is to be performed (step S130). For example, the servicing required time determining unit 64 may determine the user's regular maintenance facility as the maintenance facility at which the maintenance is to be performed.

Thereafter, the servicing required time determining unit 64 may determine the servicing required time (step S140). For example, the servicing required time determining unit 64 may determine the travel time on the basis of the traveling course from the home of the user to the maintenance facility and vice versa. The servicing required time determining unit 64 may also determine the maintenance required time on the basis of the maintenance content and the maintenance table 54 of the maintenance facility server 14. The servicing required time determining unit 64 may further determine the servicing required time on the basis of the maintenance required time and the round-trip travel time. Note that the servicing required time determining unit 64 may optionally determine the maintenance mechanic in charge at step S140.

Thereafter, the unused period determining unit 66 may acquire the user schedule data from the user schedule manager 46 of the terminal 12 of the user (step S150). Thereafter, the unused period determining unit 66 may determine the unused period during which the user is scheduled not to use the vehicle 10, on the basis of the user schedule data (step S160).

Thereafter, the servicing scheduled period setting unit 70 may determine the servicing possible period, on the basis of the unused period and the servicing required time (step S170). For example, the servicing scheduled period setting unit 70 may set, as the servicing possible period, the unused period that is equal to or longer than the servicing required time out of one or more unused periods.

Thereafter, the non-scheduled period determining unit 68 may acquire the maintenance mechanic schedule data of the maintenance mechanic in charge, from the maintenance mechanic schedule manager 56 of the maintenance facility server 14 (step S180). Thereafter, the non-scheduled period determining unit 68 may determine the non-scheduled period of the maintenance mechanic in charge on the basis of the maintenance mechanic schedule data of the maintenance mechanic in charge (step S190).

Thereafter, the servicing scheduled period setting unit 70 may determine the maintenance possible period of the maintenance mechanic in charge, on the basis of the non-scheduled period and the maintenance required time (step S200). For example, the servicing scheduled period setting unit 70 may set, as the maintenance possible period, the non-scheduled period that is equal to or longer than the maintenance required time out of one or more non-scheduled periods.

Thereafter, the servicing scheduled period setting unit 70 may temporarily set the maintenance performing period in the maintenance possible period out of one or more maintenance possible periods (step S210). For example, the servicing scheduled period setting unit 70 may temporarily set the maintenance performing period in the time-series-based order in which the maintenance possible period closest to the present is prioritized, e.g., closer the maintenance possible period is to the present, more prioritized the maintenance possible period is.

Thereafter, the servicing scheduled period setting unit 70 may temporarily set the servicing scheduled period by adding the travel time before and after the temporarily-set maintenance performing period (step S220).

Thereafter, the servicing scheduled period setting unit 70 may determine whether the temporarily-set servicing scheduled period is within the servicing possible period (step S230).

If the servicing scheduled period setting unit 70 has determined that the temporarily-set servicing scheduled period is within the servicing possible period (step S230: YES), the servicing scheduled period setting unit 70 may decide the temporarily-set maintenance performing period as the actual maintenance performing period, and may decide the servicing scheduled period that is temporarily set in association with the temporarily-set maintenance performing period as the actual servicing scheduled period (step S240). The series of processes may end thereafter. In a case where the servicing scheduled period is decided, the time of the start of the servicing scheduled period and the time of the end of the servicing scheduled period may be decided. In some embodiments, the servicing scheduled period setting unit 70 may notify the maintenance facility server 14 of the thus-decided maintenance performing period to make a reservation of the maintenance of the vehicle 10 to the maintenance mechanic schedule data of the maintenance mechanic in charge.

If the servicing scheduled period setting unit 70 has determined that the temporarily-set servicing scheduled period is not within the servicing possible period (step S230: NO), the servicing scheduled period setting unit 70 may determine whether a proposed maintenance performing period, to be set temporarily as the temporarily-set maintenance performing period, is available (step S250). If the servicing scheduled period setting unit 70 has determined that the proposed maintenance performing period is available (step S250: YES), the servicing scheduled period setting unit 70 may cause the flow to return to the process to be performed at step S210 to temporarily set the maintenance performing period repeatedly.

If the servicing scheduled period setting unit 70 has determined that the proposed maintenance performing period is not available (step S250: NO), the servicing scheduled period setting unit 70 may notify the user of failure to set the servicing scheduled period that satisfies a predetermined condition (S260). The series of processes may end thereafter. The predetermined condition may be that the maintenance performing period falls within the maintenance possible period and the servicing scheduled period falls within the servicing possible period. The servicing scheduled period setting unit 70 may perform the notification by means of sound and/or display.

Thereafter, although unillustrated, the authentication controller 72 may acquire the maintenance mechanic identifier of the maintenance mechanic in charge from the maintenance facility server 14 and may cause the storage 28 to store the acquired maintenance mechanic identifier, at the time of the start of the servicing scheduled period. Further, the automatic driving controller 60 may start the moving of the vehicle 10 to the maintenance facility on the basis of the automatic driving.

According to at least one embodiment of the technology, the vehicle 10 is moved to the maintenance facility at which the maintenance of the vehicle 10 is to be performed, on the basis of the automatic driving that is independent of the driving to be performed by the occupant, in a case where the maintenance of the vehicle 10 is determined as being necessary. Thus, the vehicle 10 that requires the maintenance is taken to the maintenance facility on the basis of the automatic driving, eliminating the user's necessity to take the vehicle 10 to the maintenance facility by driving the vehicle 10.

Hence, the vehicle 10 according to at least one embodiment of the technology makes it possible to reduce the user's trouble pertaining to maintenance.

In some embodiments, the vehicle 10 may be moved to the maintenance facility upon non-use of the vehicle 10 by the user. Hence, it is possible to perform the maintenance of the vehicle 10 without reducing convenience of the user.

In some embodiments, the servicing scheduled period may be set on the basis of the unused period that is equal to or longer than the servicing required time. Thus, the vehicle 10 following the maintenance comes back within the period during which the user does not use the vehicle 10. Hence, it is possible to ensure the convenience of the user.

In some embodiments, the maintenance performing period within the servicing scheduled period may be set on the basis of the non-scheduled period that is equal to or longer than the maintenance required time. Thus, the maintenance mechanic in charge is able to complete the maintenance of the vehicle 10 on time, making it possible to prevent prolonging of a staying time of the vehicle 10 at the maintenance facility. Hence, it is possible to prevent prolonging of a time required for the vehicle 10 to be serviced at the maintenance facility and to suppress the reduction in the convenience of the user.

In some embodiments, in a case where the maintenance is determined as being necessary, the second identifier of the smart key 16 used by the maintenance mechanic who performs the maintenance of the vehicle 10 may be stored in the storage 28 as the first identifier, during the period in which the maintenance of the vehicle 10 is to be performed. In some embodiments, in a case where the maintenance is determined as being necessary, the second identifier that is common to the first identifier stored in the storage 28 may be stored in the smart key 16 used by the maintenance mechanic who performs the maintenance of the vehicle 10, during the period in which the maintenance of the vehicle 10 is to be performed. Thus, the maintenance mechanic in charge is able to, for example, unlock the doors of the vehicle 10 without requiring the user to attend the maintenance. Hence, it is possible for the maintenance mechanic in charge to perform the maintenance work smoothly. Further, the unlocking of the doors, or any other action, to be performed by the maintenance mechanic in charge is temporarily permitted only during the period in which the maintenance of the vehicle 10 is to be performed. Hence, it is possible to increase convenience of the maintenance mechanic while taking protection and safety of the vehicle 10 into consideration.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in an example embodiment described above, the vehicle 10 may be moved to the maintenance facility on the basis of the automatic driving in a case where the maintenance is determined as being necessary, after waiting until the user does not use the vehicle 10. In some embodiments, the automatic driving controller 60 may immediately cause the vehicle 10 to move to the maintenance facility on the basis of the automatic driving after the determination is made that the maintenance is necessary. In such embodiments, the automatic driving controller 60 may cause the vehicle 10 to move to the maintenance facility after letting the user to get out of the vehicle 10 at a predetermined location.

In an example embodiment described above, the unused period determining unit 66 may determine the unused period on the basis of the user schedule data in the user schedule manager 46, although a method of determining the unused period is not limited thereto. In some embodiments, the unused period determining unit 66 may acquire the unused period by allowing the user to directly input the unused period via an in-vehicle touch panel or any other in-vehicle device. In some embodiments, the unused period determining unit 66 may perform learning of a plurality of past records related to non-use of the vehicle 10 to thereby estimate a future unused period.

In an example embodiment described above, the travel time used to determine the servicing required time may be based on the time required to move from the home to the maintenance facility and vice versa, although an origin on which the travel time is based is not limited to the home. In some embodiments, the servicing required time determining unit 64 may refer to the user schedule data and determine (or estimate) a position of the vehicle 10 that is immediately before the start of the unused period. In such embodiments, the servicing required time determining unit 64 may determine the travel time on the basis of the determined position or the estimated position as the origin.

In some embodiments, in a case where, for example, the doors of the vehicle 10 are unlocked by the smart key 16 of the maintenance mechanic in charge, the authentication controller 72 may provide the terminal 12 or any other device of the user with a notification that the doors of the vehicle 10 are unlocked by the smart key 16 of the maintenance mechanic in charge. For example, the authentication controller 72 may provide the notification via an e-mail.

In some embodiments, in a case where the instructions to, for example, unlock the doors of the vehicle 10 are received from the smart key 16 of the maintenance mechanic in charge, the authentication controller 72 may provide the terminal 12 or any other device of the user with a notification on a request as to whether to approve the permission to, for example, unlock the doors. For example, the authentication controller 72 may provide the notification via an e-mail.

The vehicle 10 according to any embodiment of the technology may be an automobile having an engine as a drive source, an electric vehicle having a drive motor as a drive source, or a hybrid electric vehicle having both the engine and the drive motor.

The vehicle controller 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 30 illustrated in FIG. 1.

The invention claimed is:

1. A vehicle comprising:
 a maintenance-necessity detector configured to determine whether maintenance of the vehicle is necessary;
 a storage that contains a first identifier; and
 a vehicle controller configured to, based on the maintenance being determined by the maintenance-necessity detector as being necessary, transmit a maintenance-necessary data to a maintenance facility including a communicator, the maintenance-necessary data representing at least a maintenance content to be performed for the vehicle in the maintenance facility,
 the vehicle controller including:
  a servicing required time determining unit configured to determine a servicing required time based on a travel time and a maintenance required time, in a case where the maintenance is determined by the maintenance-necessity detector as being necessary, the serving required time being a time required for the vehicle to be serviced at the maintenance facility, the travel time being a time required for the vehicle to move to the maintenance facility, the maintenance required time being a time required to perform the maintenance;
  an unused period determining unit configured to determine an unused period, the unused period being a period during which the user is scheduled not to use the vehicle;
  a servicing scheduled period setting unit configured to set a servicing scheduled period based on the unused period that is equal to or longer than the servicing required time, the servicing scheduled period being a period during which the vehicle is scheduled to be serviced at the maintenance facility; and
  an authentication controller configured to permit unlocking of a door of the vehicle, in a case where the first identifier stored in the storage and a second identifier transmitted from a smart key that instructs the unlocking of the door have a predetermined relationship,
 wherein the vehicle controller is configured to, based on the maintenance being determined by the maintenance-necessity detector as being necessary cause the vehicle to move via automatic driving to the maintenance facility at which the maintenance of the vehicle is to be performed, on a basis of the automatic driving that is independent of driving to be performed by an occupant of the vehicle, wherein, in a case where a time of a start of the servicing scheduled period has come, the authentication controller is configured to:

make an inquiry at a maintenance facility server provided at the maintenance facility about a maintenance mechanic identifier that corresponds to the maintenance mechanic in charge;

acquire the maintenance mechanic identifier from the maintenance facility server; and cause the storage to additionally store the maintenance mechanic identifier as the first identifier, and wherein, in a case where a time of an end of the servicing scheduled period has come, the authentication controller is configured to cause the storage to delete the maintenance mechanic identifier that has been additionally stored as the first identifier.

2. The vehicle according to claim 1, wherein the vehicle controller is configured to cause the vehicle to move to the maintenance facility upon non-use of the vehicle by a user of the vehicle.

3. The vehicle according to claim 2, wherein the authentication controller is configured to cause, during a period in which the maintenance of the vehicle is to be performed, the storage to store, as the first identifier, the second identifier of the smart key used by a maintenance mechanic who performs the maintenance of the vehicle, in the case where the maintenance is determined by the maintenance-necessity detector as being necessary.

4. The vehicle according to claim 1, wherein the authentication controller is configured to cause, during a period in which the maintenance of the vehicle is to be performed, the storage to store, as the first identifier, the second identifier of the smart key used by a maintenance mechanic who performs the maintenance of the vehicle, in the case where the maintenance is determined by the maintenance-necessity detector as being necessary.

5. The vehicle according to claim 1, wherein the vehicle controller is configured to, based on the running possible determining unit determining that the vehicle is unable to run by itself to move to the maintenance facility, request a maintenance mechanic dispatch to a current location of the vehicle to perform the maintenance.

6. The vehicle according to claim 1, wherein the maintenance-necessary data includes information representing at least one of a malfunction of a vehicle air conditioner, a replacement of engine oil, a flat tire and an engine trouble, and wherein the running possible determining unit is configured to:

in a case where the maintenance-necessary data represents at least one of the malfunction of the vehicle air conditioner and the replacement of engine oil, determine that the vehicle is able to run by itself to move to the maintenance facility; and in a case where the maintenance-necessary data represents at least one of the flat tire and the engine trouble, determine that the vehicle is unable to run by itself to move to the maintenance facility.

7. The vehicle according to claim 6, wherein the vehicle controller is configured to, based on the running possible determining unit determining that the vehicle is unable to run by itself to move to the maintenance facility, send to the maintenance facility a request for a maintenance mechanic dispatch to a current location of the vehicle.

8. The vehicle according to claim 1, wherein the non-use of the vehicle includes an unoccupied vehicle.

9. A vehicle maintenance system comprising the vehicle and the maintenance facility server according to claim 1, wherein the maintenance facility server stores data including information of the maintenance content, the maintenance required time, the maintenance mechanic in charge, and the maintenance mechanic identifier that are associated with each other, and wherein the maintenance facility server is configured to:

identify, in response to receiving the maintenance-necessary data from the vehicle, the maintenance required time based on the data, and transmit at least data of the maintenance required time to the vehicle; and identify, in response to receiving the inquiry, the maintenance mechanic identifier of the maintenance mechanic in charge based on the data, and transmit at least data of the maintenance mechanic identifier to the vehicle.

10. The vehicle according to claim 1, further comprising a non-scheduled period determining unit configured to determine a non-scheduled period, the non-scheduled period being a period during which a maintenance mechanic who performs the maintenance of the vehicle has no schedule, wherein the servicing scheduled period setting unit is configured to set a maintenance performing period on a basis of the non-scheduled period that is equal to or longer than the maintenance required time, the maintenance performing period being a period during which the maintenance is scheduled to be performed within the servicing scheduled period.

11. The vehicle according to claim 10, wherein the authentication controller is configured to cause, during a period in which the maintenance of the vehicle is to be performed, the storage to store, as the first identifier, the second identifier of the smart key used by a maintenance mechanic who performs the maintenance of the vehicle, in the case where the maintenance is determined by the maintenance-necessity detector as being necessary.

12. A vehicle comprising:

circuitry including a processor and a storage that contains a first identifier, the circuitry configured to:

determine whether maintenance of the vehicle is necessary;

based on the maintenance being determined by the detector as being necessary, transmit a maintenance-necessary data to a maintenance facility including a communicator, the maintenance-necessary data representing contents of maintenance to be performed for the vehicle in the maintenance facility; and determine a servicing required time based on a travel time and a maintenance required time, in a case where the maintenance is determined by the maintenance necessity detector as being necessary, the serving required time being a time required for the vehicle to be serviced at the maintenance facility, the travel time being a time required for the vehicle to move to the maintenance facility, the maintenance required time being a time required to perform the maintenance;

determine an unused period, the unused period being a period during which the user is scheduled not to use the vehicle;

set a servicing scheduled period based on the unused period that is equal to or longer than the servicing required time, the servicing scheduled period being a period during which the vehicle is scheduled to be serviced at the maintenance facility;

permit unlocking of a door of the vehicle, in a case where the first identifier stored in the storage and a second identifier transmitted from a smart key that instructs the unlocking of the door have a predetermined relationship, based on the maintenance being determined by the detector as being necessary, cause the vehicle to move via automatic driving to the maintenance facility at which the maintenance of the vehicle is to be performed, on a basis of the automatic driving that is independent of driving to be performed by an occupant of the vehicle, wherein, in a case where a time of a start of the servicing scheduled period has come, the circuitry is configured to:

make an inquiry at a maintenance facility server provided at the maintenance facility about a maintenance mechanic identifier that corresponds to the maintenance mechanic in charge;

acquire the maintenance mechanic identifier from the maintenance facility server; and cause the storage to additionally store the maintenance mechanic identifier as the first identifier, and wherein, in a case where a time of an end of the servicing scheduled period has come, the circuitry is configured to cause the storage to delete the maintenance mechanic identifier that has been additionally stored as the first identifier.

13. The vehicle according to claim 12, wherein the maintenance-necessary data includes information representing at least one of a malfunction of a vehicle air conditioner, a replacement of engine oil, a flat tire and an engine trouble, and wherein the circuitry is configured to:

in a case where the maintenance-necessary data represents at least one of the malfunction of the vehicle air conditioner and the replacement of engine oil, determine that the vehicle is able to run by itself to move to the maintenance facility; and in a case where the maintenance-necessary data represents at least one of the flat tire and the engine trouble, determine that the vehicle is unable to run by itself to move to the maintenance facility.

14. The vehicle according to claim 13, wherein the circuitry is configured to, based on determining that the vehicle is unable to run by itself to move to the maintenance facility, send to the maintenance facility a request for a maintenance mechanic dispatch to a current location of the vehicle.

15. A vehicle maintenance system comprising the vehicle and the maintenance facility server according to claim 12, wherein the maintenance facility server stores data including information of the maintenance content, the maintenance required time, the maintenance mechanic in charge, and the maintenance mechanic identifier that are associated with each other, and wherein the maintenance facility server is configured to:

identify, in response to receiving the maintenance-necessary data from the vehicle, the maintenance required time based on the data, and transmit at least data of the maintenance required time to the vehicle; and identify, in response to receiving the inquiry, the maintenance mechanic identifier of the maintenance mechanic in charge based on the data, and transmit at least data of the maintenance mechanic identifier to the vehicle.

* * * * *